US005089971A

United States Patent [19]

Gerber

[11] Patent Number: 5,089,971

[45] Date of Patent: Feb. 18, 1992

[54] METHOD AND APPARATUS FOR CUTTING PARTS FROM HIDES OR SIMILAR IRREGULAR PIECES OF SHEET MATERIAL

[75] Inventor: Heinz J. Gerber, West Hartford, Conn.

[73] Assignee: Gerber Garment Technology, Inc., Tolland, Conn.

[21] Appl. No.: 506,917

[22] Filed: Apr. 9, 1990

[51] Int. Cl.[5] .............................................. G06F 15/46

[52] U.S. Cl. ...................................... 364/470; 83/939

[58] Field of Search .......................... 364/474.13, 470; 83/936, 938, 939, 940, 941

[56] References Cited

U.S. PATENT DOCUMENTS

| | | | |
|---|---|---|---|
| 3,596,068 | 7/1971 | Doyle . | |
| 3,815,221 | 6/1974 | Pearl | 83/941 |
| 3,875,389 | 4/1975 | McFadden . | |
| 3,887,903 | 6/1975 | Martell . | |
| 4,204,145 | 5/1980 | Hevenor et al. . | |
| 4,485,712 | 12/1984 | Gerber | 83/941 |
| 4,725,961 | 2/1988 | Pearl . | |
| 5,020,405 | 6/1991 | Wolfson et al. | 83/940 |

*Primary Examiner*—Jerry Smith
*Assistant Examiner*—Patrick D. Muir
*Attorney, Agent, or Firm*—McCormick, Paulding & Huber

[57] ABSTRACT

In a method and apparatus for cutting parts from hides from different shapes and sizes a digitizer and a cutter are provided which make it possible to digitize a hide at one time on the digitizer and to then cut it at a later time on the cutter with the hide when spread on the supporting surface of the cutter being given a shape and location exactly corresponding to its shape and location on the supporting surface of the digitizer. Therefore, the digitized representation of each hide may be used to create an efficient cuting marker for the hide which marker can then be used to cut the hide on the cutter without producing rejects or other cutting errors due to the location and shape of the hide on the supporting surface of the cutter not agreeing with those of the hide on the supporting surface of the digitizer. This arrangement allows keeping a large number of digitized hides in inventory and selecting from this inventory those hides which can be used most efficiently to produce the parts required to fill a given parts request.

20 Claims, 2 Drawing Sheets

METHOD AND APPARATUS FOR CUTTING PARTS FROM HIDES OR SIMILAR IRREGULAR PIECES OF SHEET MATERIAL

FIELD OF THE INVENTION

This invention relates to a method and apparatus for cutting parts from hides or other irregular pieces of sheet material for use in making upholstery, garments or other articles, and deals more particularly with an improved method and apparatus for cutting such pieces of sheet material which in comparison to known methods and apparatus can be used to increase the efficiency of the cutting, both as to the labor required and as to the utilization of the hides, and to improve the quality of the resulting parts.

BACKGROUND OF THE INVENTION

The method and apparatus of the invention may be used for the cutting of many types of sheet material where the sheets are irregular insofar as having different sizes and shapes and/or faults or areas of differing quality the number and location of which occur randomly in different pieces. Perhaps the most common application to which the invention may be put is the cutting of hides to produce parts for automobile upholstery, furniture upholstery, shoes and other leather articles. Therefore for convenience, the invention is hereinafter described and claimed with the term "hide" being used to refer to each work piece in question. It is to be understood however that there is no intention in doing so to limit the invention to work pieces produced from animal skins, but instead it is intended that the invention embrace use of the claimed method and apparatus with other irregular work pieces as well.

In the case of hides produced from animal skins, the hides not only vary in size and shape from one another, but also often contain faults such as scars, holes or scratches, or areas of differing thickness, texture or other quality peculiar to each hide. Therefore, without a large wastage of material it is usually impossible to cut a standard selection and arrangement of quality parts from each hide. Instead, it is common practice preparatory to the cutting of a hide to compare it with patterns representing desired parts and to select and move such patterns over the surface of the hide until an acceptable arrangement of the patterns on the hide is obtained. A record of this acceptable arrangement of part patterns is then made in some way for later use in cutting parts corresponding to the patterns from the hide. This record may take various different forms and is hereinafter referred to as a "marker".

Another problem in the cutting of hides is that since the hides are of limited size, when a large number of parts is desired it is necessary to cut them from a number of individual hides, and in the past it has been difficult to achieve an efficient assignment of particular ones of the desired parts to different hides and to arrange the parts assigned to each hide in an efficient way reducing material wastage.

Also, when the desired parts consist mainly of relatively large parts, such as is generally the case, for example, when making parts for automobile upholstery, it is often difficult or impossible to arrange part patterns on a hide without leaving large areas of waste material from which smaller parts, such as parts for watch straps or wallets, for other jobs might be cut if some practical way were available for including such parts in the marker created for each hide.

The general object of the invention is therefore to provide a method and apparatus whereby the above-mentioned problems are solved to produce a highly efficient utilization of hides in the cutting of parts therefrom with a minimum of labor being required. As part of the solution of this object the invention involves a method and apparatus wherein a plurality of hides are first digitized to produce a computer memory stored record of their shapes and sizes and other surface features of interest such as the locations and sizes and shapes of faults and areas of differing quality. After a substantial stock of digitized hides has been produced, information defining a set of desired parts is supplied to a computer which then either automatically or through interaction with a human operator makes an efficient selection of hides from the digitized stock and produces a marker for each selected hide containing an efficient selection and arrangement of parts to be cut from that hide.

A practical carrying out of this procedure involves first digitizing a supply of hides and then holding them in storage remote from the digitizing table until selected ones are called up for cutting. This requires that each hide be spread once for digitizing and be spread again for cutting. In doing this, however, it is most important that the hide when spread for cutting have precisely the same shape as it had when spread for digitizing and that it have a location on the supporting surface of the cutter bearing a known relationship to its location on the supporting surface of the digitizer. During both the digitizing process and the cutting process it is also desirable that the hide be held quite flatly against the support surface so as to avoid wrinkles, raised bumps and other departures from a flat surface. Hides, however, are generally relatively flexible and shiftable in plane so that if a hide is casually spread two times the shape it assumes the second time may depart significantly from the shape it assumed the first time. For example, if in the second spreading two points of the hide for reference purposes are taken to have locations exactly corresponding with the locations of those points assumed during the first spreading, other points of the hide may depart by as much as an inch or more from the locations assumed during the first spreading.

A further object of the invention is therefore to include in the method and apparatus of the invention a way of assuring that a hide when spread for cutting will have a shape very closely corresponding to the shape assumed when spread for digitizing, thereby allowing the production and use of efficiently laid out markers for the hides without danger of cutting unacceptable parts because of the hide having a different shape when cut than when digitized.

A still further object of the invention is to provide a method and apparatus of the aforegoing character wherein each hide is held in a desirable flat condition both during digitizing and cutting.

Other objects and advantages of the invention will be apparent from the following description and claims and from the accompanying drawings.

SUMMARY OF THE INVENTION

The invention resides in a method for cutting parts from hides or similar irregular pieces of sheet material wherein a plurality of hides are converted to a set of digitized hides by spreading each hide on a digitizing table and digitizing it to provide a digital representation of the hide transmitted to a computer memory, and while the hide is spread on the digitizing table associating with it a means for establishing its shape and position relative to the table. Thereafter, the stored representations of the digitized hides are used in conjunction with information defining a set of desired parts to produce a marker for one or more of the digitized hides. Each selected hide is then placed on a cutting table using the shape and position establishing means associated with it to cause it to assume on the cutting table a shape and location corresponding to its shape and location on the digitizing table, and the marker for that hide is then used to control a cutter for cutting the parts of the marker from the hide.

The invention further resides in the digitizer table and the cutting table each having a plurality of pins located on opposite sides of the space normally occupied by the hide spread on the table and by the shape and position establishing means associated with each hide being a flexible means having holes for receiving the pins of the digitizing table and of the cutting table, with the flexible means when placed over the pins of the digitizing table being held in a relatively taut condition and with the hide then being attached by adhesive or other means to the flexible means. The flexible means attached to each hide is then moveable over the pins of the cutting table to cause the attached hide to assume on the cutting table a shape and location corresponding to its shape and location on the digitizing table.

The invention also resides in the construction of the digitizing and cutting tables and in the use of vacuum with either or both of said tables to hold the hides spread thereon in flat condition.

The invention still further resides in other detailed features described in the accompanying claims.

DETAILED DESCRIPTION OF THE PREFERRED EMBODIMENTS

Figure 1:
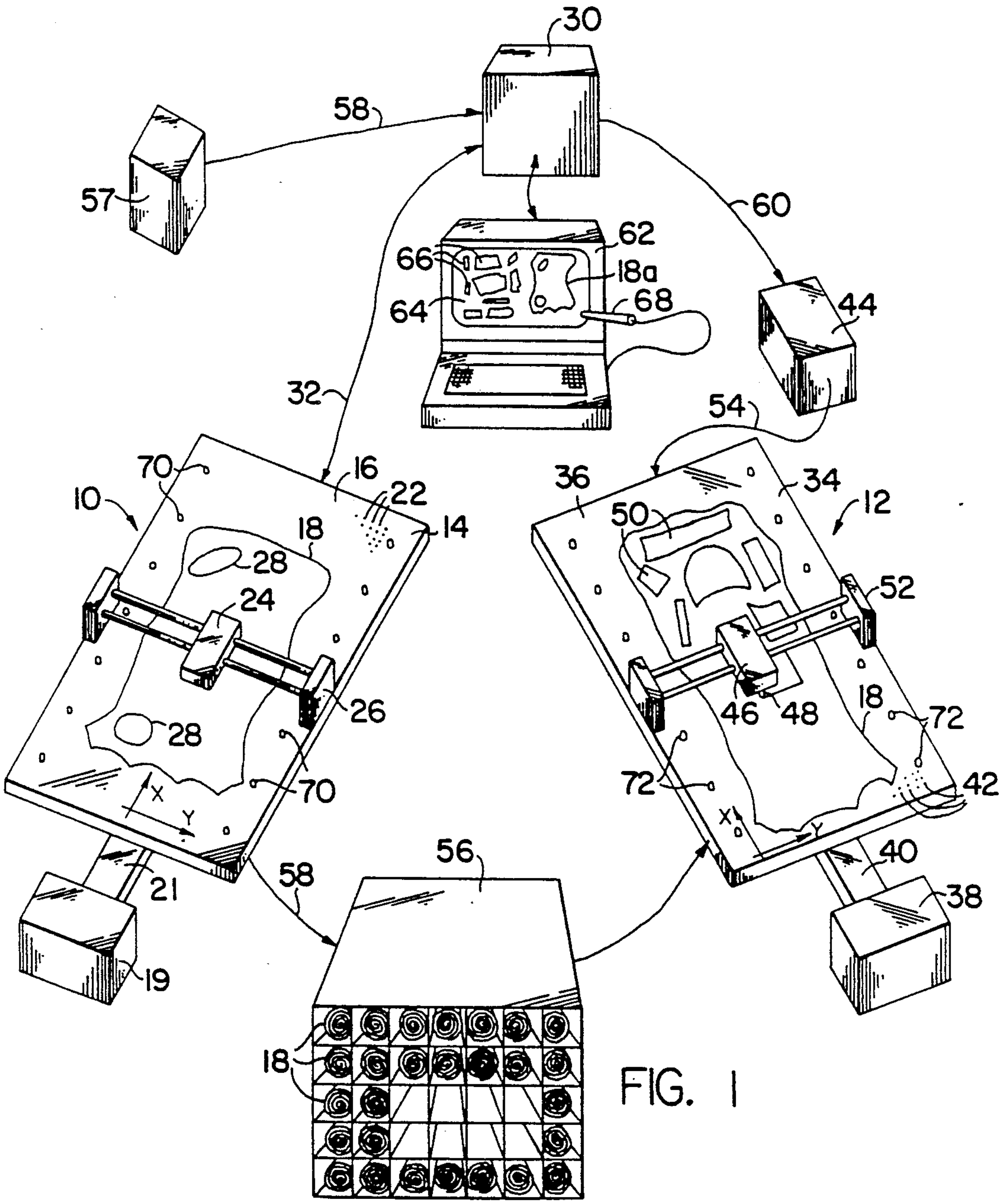
FIG. 1 is a schematic perspective view showing a hide digitizing and cutting system embodying the present invention.

FIG. 1 shows an exemplary system embodying the present invention. Referring to this figure the illustrated system includes a digitizer indicated generally at 10 and a cutter indicated generally at 12.

The digitizer 10 includes a table 14 having an upwardly facing supporting surface 16 onto which a hide 18 may be spread for digitizing. The table 14 may be made in various different ways and preferably is one having associated with it a means for applying a vacuum to the supporting surface 16 to aid in holding a hide in flat condition on the surface. Such vacuum means may also vary widely in construction, but in the illustrated case is shown to comprise a vacuum source 19 connected by a duct 21 to one or more vacuum chambers (not shown) located below the table 14 and communicating with a plurality of holes 22 passing through the upper portion of the table and distributed over the supporting surface 16 so that air is withdrawn downwardly through the holes 22 to create the desired vacuum effect. If desired, after a hide is spread on the supporting surface 16 a thin sheet of air impermeable material may be spread over the hide and the supporting surface, or at least over the portion of the supporting surface not covered by the hide, to reduce the loss of vacuum by the flow of air through the holes 22 not covered by the hide. However, preferably the number and distribution of the holes 22, the size of the surface 16 in relation to the size of the hides to be digitized, and the capacity of the vacuum source 18 are such that an acceptable vacuum holding effect is applied to a hide spread on the supporting surface without the need for sealing the holes 22 not covered by the hide.

The digitizer 10 also includes a means for digitizing the hide spread on its supporting surface. This means may also take various different forms and could, for example, be a means utilizing a point type of digitization in which a cursor is moved either manually or automatically (as by a line following mechanism) along the edge of the hide and along other lines of interest with the coordinates of the cursor at selected points being sensed and recorded in some well know way. In the present case, however, the digitizer is shown to be a scanning type one including a digitizer head 24 moveable in a raster scanning fashion over the supporting surface 16. For this purpose the head is carried by a carriage 26 moveable in the illustrated X-coordinate direction relative to the table 14, with the head 24 being moveable in the illustrated Y-coordinate direction on the carriage 26. The head may for example carry a light source directing light toward the surface 16 and one or more lines, extending in the X-coordinate direction, of photo detectors for sensing light reflected from the supporting surface 16 or the hide spread thereon. In a hide digitizing procedure the carriage 26 is first positioned at one end of the table 14 and the head 24 then moved in the Y-direction across the surface 16. The carriage 26 is then indexed a distance in the X-coordinate direction matching the length of the line of photo detectors, and the head is then again moved in the Y-coordinate direction across the table, and this process is repeated until the carriage 26 reaches the opposite end of the table.

Prior to the digitizing of a hide lines, such as indicated at 28, may be drawn on the hide, either before or after it is spread on the digitizer table, to designate areas containing flaws or areas of differing quality which should be taken into account in cutting pieces from the hide. These lines are drawn with chalk or other media capable of being detected by the digitizing head 24. The photo detectors used in the head 24 are preferably ones able to distinguish between a number of different levels of reflectivity or between a number of different colors. Therefore, one color of chalk may be used to indicate major flaws, another color used to indicate minor flaws and another color used to designate thin areas, etc. so that the digitizer head is able to detect not only the location of a line drawn on the hide but will also be able to determine the type of flaw or condition it represents. Thus, as the digitizer head 24 is scanned back and forth across the hide 18 in raster fashion it produces a digitized representation of the shape and size of the hide, by distinguishing through the difference in reflectivity of the supporting surface and the hide the border of the hide, and of the shape and location and character of the marked areas of interest; and this digitized representation is then supplied to the memory of a computer 30 which also, as shown by the line 32, may be used to control the scanning movement of the digitizer head 24.

If the application of chalk lines, or lines drawn with other media, directly onto the hides causes problems by way of possible damage or marring of the hides, such problems may be avoided by spreading a thin transparent sheet of plastic or the like over a hide spread on the digitizing table before marking the flaws and other areas of interest. Thus, after such an overlay sheet is spread over a hide, and before the digitizing of the hide takes place, the flaws and other areas of interest may be marked by drawing lines on the overlay sheet with wax crayons or other writing instruments compatible with the sheet. Such an overlay sheet could be a reusable one with the marks applied thereto for one hide being erased before the sheet is spread over the next hide, and such a reusable overlay sheet could be mounted on a window shade type arrangement attached to the digitizing table to allow the sheet to be withdrawn from a roll when needed for spreading over a hide and permitting it to be retracted onto the roll during periods of nonuse. Alternatively, the sheet may be an expendable one from which the markings are not erased after use, and it may also serve, if desired, the previously described purpose of a sheet spread over the entire surface of the digitizing table to seal the vacuum holes 22 not covered by the hide in question. It should also be noted that after an overlay sheet of the last described type is used with a hide on the digitizing table, it can be saved and reused with a hide on the cutting table for the purpose of sealing the vacuum holes 42 of the cutting table not covered by the hide spread thereon. Then in the subsequent cutting of the hide on the cutting table, the overlay sheet is cut along with the hide and later discarded.

The cutter 12 comprises a table 34 having a supporting surface 36 for supporting a hide 18 to be cut. Similarly to the digitizer table 14, the table 34 preferably has associated with it a means for applying a vacuum to the supporting surface 36 to aid in holding a hide spread on the surface 36 in a flat condition while being cut. In the illustrated case this means comprises a vacuum source 38 connected by a duct 40 to one or more vacuum chambers (not illustrated) located below the table 34 and communicating with a plurality of holes 42 passing through the upper portion of the table and distributed over the surface 36 so that air is drawn through the openings 42 to create the desired vacuum effect. As in the case with the digitizer, preferably the holes 42 are of such size, number and distribution, the supporting surface 36 is of such size in relation to the size of the hides being cut, and the vacuum source 38 is of such capacity that an adequate vacuum holding effect is achieved without need for sealing the holes 42 left uncovered by a hide. However, if desired, a sheet of air impermeable material may be spread over the exposed holes 42 to increase the degree of vacuum applied to the hide.

The cutter 12 is an automatically controlled one controlled by a controller 44 and having a cutter head 46 which cuts in a linear fashion by moving a cutting tool along the desired lines of cut. The cutting tool may take many different forms such as, for example, a rotating cutter wheel, a reciprocating knife, an ultrasonic cutter, a laser cutter or a water jet cutter, and is in FIG. 1 shown to be a reciprocating knife 48. Therefore, the upper portion of the table 34 is one, such as a bristle bed or a bed of foamed material, penetrable by the lower end of the knife. Exemplary parts cut from the hide are indicated at 50. The cutter head is mounted on a carriage 52 moveable in the illustrated X-coordinate direction relative to the supporting surface 36 with the head 46 being moveable on the carriage 56 in the illustrated Y-coordinate direction. In a well known way suitable signals supplied by the controller 44 over the line 54 control suitable motors (not shown) for driving the carriage 52 in the X-coordinate direction and the cutter head 46 in the Y-coordinate direction, as well as for accomplishing other functions such as moving the knife 48 vertically between cutting and noncutting positions.

The cutting system of FIG. 1 as so far described is useful in digitizing and cutting hides in the following way according to the invention. A group of hides is first digitized by spreading each hide on the digitizing table 14, digitizing the hide by moving the scanning head 24 over it in a raster scanning fashion to create a digital representation of the hide, storing the digital representation in the memory of the computer 30 and then removing the hide from the digitizer table 14 and moving it to a place of storage. For purposes of illustration in FIG. 1 such place of storage is represented by a storage container 56 having a plurality of compartments for receiving individuals ones of the stored digitized hides 18. The arrow 58 of FIG. 1 represents the process of removing a hide from the digitizer table 14 to the storage container 56. As each hide is digitized it is given an identifying number which is in some convenient way associated physically with the hide, as by way of an adhesive label attached to the hide, and which identifying number is also supplied to the memory of the computer 30 along with the digital representation.

In one version of the invention the label attached to the hide may include a bar code identifying the hide and which bar code is readable by the cutter to assure cutting of the correct marker.

After a relatively large number of hides have been digitized and moved to storage their digital representations, which are now in the memory of the computer 30 may be used to provide markers for cutting a selected number of the digitized hides to produce a set of parts fulfilling a given parts request.

The actual marker making step may be carried out in various different ways using various known pieces of marker making equipment without departing from the invention. In the illustrated case an input means 57 supplies to the computer 30, over the line 58, information defining the parts required to fulfill a given parts request. This information may include a digital representation of the size and shape of each unique part involved in the request as well as information concerning the number of such parts included in the request. The digital representation of each such peculiar part may in turn be obtained by the means 57 including a scanner which can scan physical part patterns or templates to produce the digital representations. On the other hand, the memory of the computer 30 may already have stored in it a large number of digital representations comprising a menu of parts selectable from the memory as needed with the information supplied by the means 57 consisting principally of information specifying the particular parts to be selected from memory and the number of times each selected part is to be reproduced to fulfill the request.

With the aid of the computer 30 the digital hide representations stored in the computer memory can be compared with the requested parts defining information to produce markers in digital form which are supplied to the controller 44 over the line 60, with the controller 44 then functioning to convert this marker information to commands controlling the cutter 12 to cut the parts of the marker from the associated hide.

The computer 30 may be programmed to automatically carry out the marker making function, on the basis of the stored digital hide representations and the requested part defining information, without human intervention. In the illustrated case, however, the marker making procedure is designed to interact with a human operator through the use of a marker making terminal 62 having a visual display screen 64. The actual controls provided by or associated with the terminal 62 as well as the type of display made on the screen 64 may vary widely without departing from the invention. The basic function of the screen 64 is, however, to display one or more representations of digitized hides, such as shown at 18*a*, along with digital visual representations, indicated at 66, of some or all of the parts required to fill a parts request. The operator then through the use of a light pen 68 or other control picks up the visually displayed parts 66 and places them on the visually displayed hide representation 18*a* and changes their selection and varies their placement until an acceptable arrangement of parts in the hide representation, corresponding to an efficient utilization of the hide, is achieved. This arrangement is then captured as a marker and the related information supplied to the computer and subsequently to the controller 44 for cutting the assorted hide or hides.

Since the operator is not required to use the particular hide or hides shown at any instant on the screen 64 he can withdraw other hides from the computer memory for display on the screen and test them in comparison to the displayed parts until arriving at a selected hide or set of hides which permits an acceptably efficient utilization of hides for the parts request at hand. It is also possible that the parts 66 shown on the screen be not only the parts for a single parts request but that the parts also include parts for some other job or request. This, for example, is of advantage in cases where a parts request involves principally relatively large parts and the other parts request or job involves relatively small parts. In such case, after as many as possible of the parts of the first request have been arranged on a hide representation some of the remaining area which would otherwise be waste may be filled with parts of the second request or job.

The general digitizing and cutting procedure described above requires, for reasonably good efficiency, that a hide when spread on the cutting table have a shape very closely similar to the shape assumed on the digitizing table and have a location on the cutting table bearing a known relationship to its location on the digitizing table. Hides, however, are relatively flexible and shiftable in plane so that if a hide is casually spread both on the digitizing table and on the cutter table it is almost a certainty that the shape of the hide on the cutter table will be substantially different from its shape on the digitizing table. The marker making procedure, however, and the cutting information supplied to the cutter table by the controller 44 is based on the shape of the hide as digitized. The hide not having the same shape on the cutting table as on the digitizing table will therefore likely result in the cutting of many reject parts or will require the use of less efficient layouts of the parts in the marker to accommodate tolerances used to compensate for the likely differences in shape.

A further feature of the invention is therefore the provision and use of a means for capturing or establishing the shape and location of a hide on the digitizing table 14 and for precisely recreating such position and location of the hide on the cutting table 34.

As shown in FIG. 1 the digitizing table 14 has a plurality of pins 70 extending upwardly from the supporting surface 16, with the pins being located in two rows on opposite sides of the space normally occupied by a hide 18. Likewise, the cutter table 34 has a plurality of pins 72 extending upwardly from its supporting surface 36 and located in rows on opposite sides of the space normally occupied by a hide 18. The placement of the pins 70 of the digitizing table corresponds exactly with the placement of the pins 72 of the cutter table.

The pins 70 of the digitizing table serve to receive the holes of a flexible means which when placed on the pins 70 extends in a relatively taut condition across the hide 18 on the digitizer table. The hide is then attached to the flexible means which in turn fixes the hide's shape and position relative to the holes. When the hide is removed from the digitizer table the flexible means is removed with it and remains attached to it until the hide is moved to the cutting table 34. Upon reaching the cutting table the holes of the flexible means are placed over the pins 72 of the cutting table with the result of the hide then being positioned on the supporting surface 36 of the cutting table with a shape and location corresponding to its shape and location on the supporting surface 16 of the digitizer.

Various different means may be used as the flexible means referred to above, and various different means may be used for attaching the flexible means to a hide.

Figure 3:
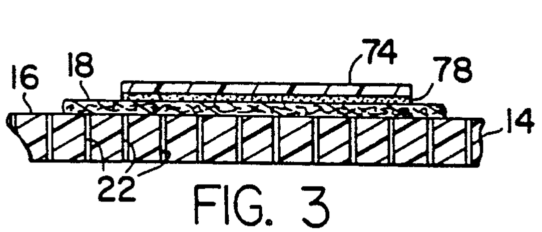
FIG. 3 is a fragmentary sectional view taken on the line 3—3 of FIG. 2.
Figure 4:
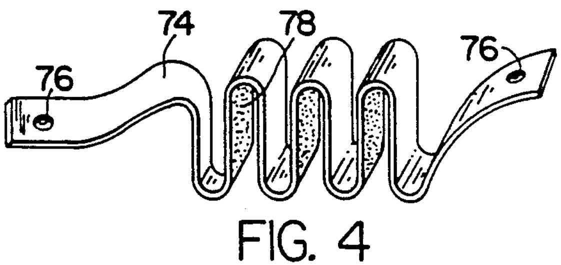
FIG. 4 is a perspective view showing one of the flexible straps comprising the shape and position establishing means of FIG. 2.
Figure 2:
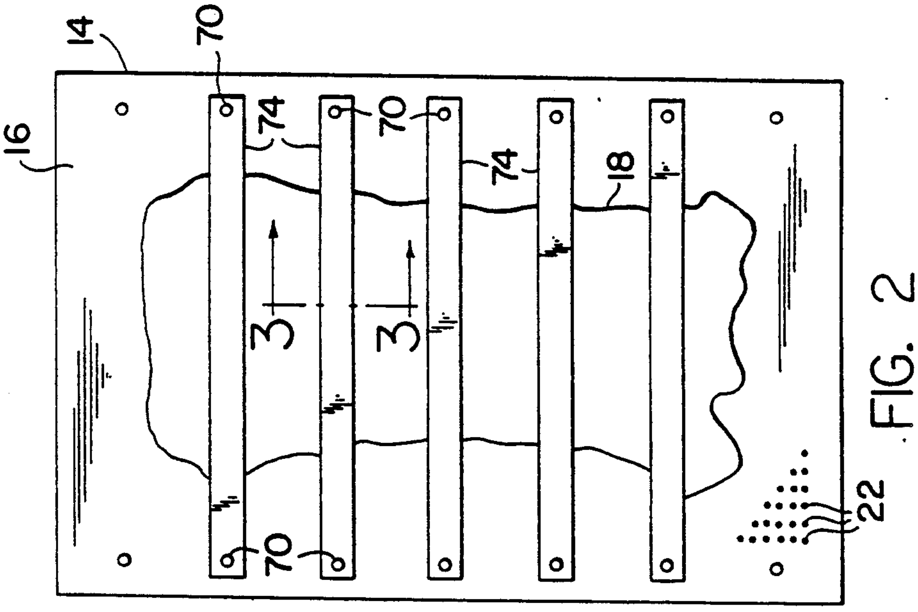
FIG. 2 is a schematic plan view showing the digitizing table of FIG. 1 with a shape and location establishing means associated with the hide spread on the table, the digitizing head being omitted from this view for clarity.

By way of example, in FIGS. 2, 3 and 4 the flexible means for establishing the shape and position of a hide relative to the digitizing table 14 comprises a plurality of straps 74 each having a hole 76 at each of its opposite ends. Each strap 74 is of such length that when its two holes 76 are placed over two opposite pins 70 the strap extends across the hide 18 on the supporting surface 16 and is held in a relatively taut condition. The material of which the straps are made is one which is relatively inelastic. For example, the straps may be made of woven strands of plastic such as Dacron or polypropylene. The straps are preferably applied to the digitizing table after the involved hide has been digitized by the digitizing head 24, but this is not necessary and if desired the straps may be applied to the digitizer table before the hide is digitized with the straps passing either beneath or above the hide. If the straps are attached to the top surface of the hide prior to the digitizing step. they may be made of a transparent material so as to have little or no effect on the later digitizing of the hide. In any event, before the hide is removed from the digitizing table the straps are attached to it in such a way as to allow them to be later removed without significant damage to the hide. For example, the straps may be stapled to the hides. In the preferred and illustrated case, however, the straps each include a layer 78 of pressure sensitive release adhesive so that after a strap has been attached to two pins 70 of the digitizer table it can be attached to the hide 18 by pressing it against the hide.

After the hide of FIG. 2 is removed from the digitizing table 14 it can be rolled, with the straps still attached, for placement in the storage container 56 or other storage means. Later when the same hide is called up for cutting it is removed from storage, unrolled and spread on the supporting surface of the cutting table 34 by placing the holes 76 of the straps 74 over the pins 72 of the cutting table. The straps can then be removed, preferably with vacuum applied to the hide to hold the hide better in place, before the cutting of the hide takes place.

Figure 5:
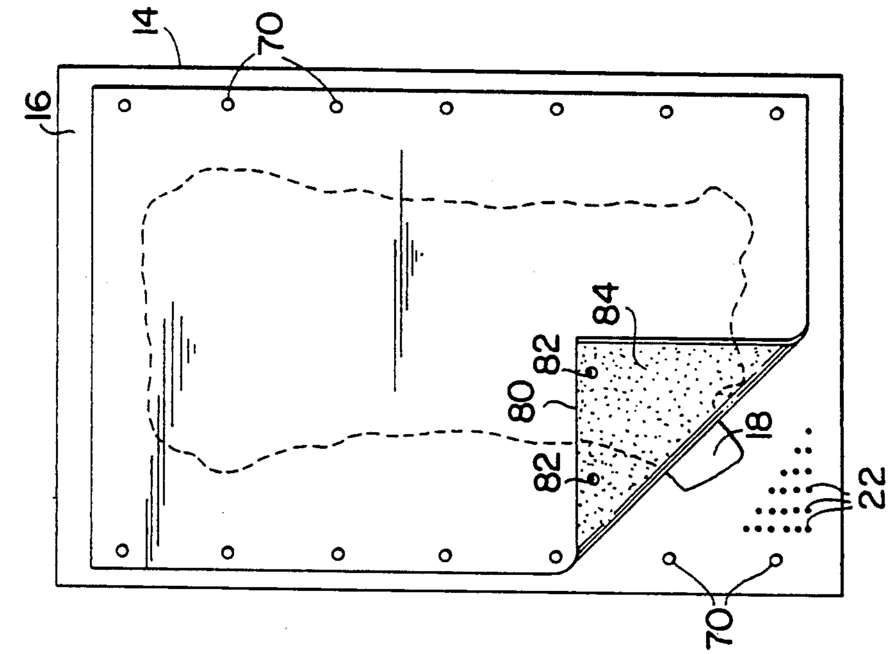
FIG. 5 is a plan view similar to FIG. 2 but showing an alternative form of the means for establishing the shape and position of the hide spread on the digitizing table.

Another form of flexible means for establishing the position of a hide relative to the digitizing table 14 is shown in FIG. 5 wherein such means constitutes a single sheet of flexible material, such as sheet 80 of relatively inelastic plastic having holes 82 in each of its side edges for receiving the pins 70 of the digitizing table as well as for later receiving the pins 72 of the cutting table 34. For attaching the sheet to the hide 18 on the digitizing table the sheet 80 also preferably includes a layer 84 of pressure sensitive adhesive on its bottom surface.

In FIG. 1 the pins 70 of the digitizing table 14 and the pins 72 of the cutting table 34 are shown to be fixed relative to the supporting surface 16 of the digitizing table and to the supporting surface 36 of the cutting table. This fixed arrangement is not, however, necessary to the invention and instead the pins 70 and 72 may be made to be adjustable to different positions along the length of the tables 14 and 34. In this case it will be understood that if the pins 70 of the digitizing table are adjusted to a given positional arrangement of the pins 72 of the cutting table 34 are likewise adjusted to a corresponding positional relationship. If straps are used as the flexible means this will require no change in them. However, if a flexible sheet is used as the flexible means such sheets will have to be modified to have an arrangement of holes 82 conforming to the new arrangement of the pins.

The tables 14 and 34 in FIG. 1 are both shown as being simple static tables. It will be understood, however, that either one or both could be a more complex table and could be a conveyor table with one zone for loading a hide and another zone for digitizing or cutting a hide, and also possibly another zone for unloading a hide after having been digitized or cut. It is also possible, and contemplated by the invention, that a single table associated with both a digitizer head and a cutter head might be used for both the digitizing and cutting procedures. Also, either one or both of the tables 14 and 34 may be designed to hold more than one hide at a time for digitizing or cutting. Other similar modifications of the tables or supports for the hides during digitizing and cutting will be apparent to a person skilled in the art and are part of the invention.

In the two preferred embodiments of the invention described above upwardly extending pins 70 and 72 are included on the digitizing table and the cutting table and cooperate with the straps 74 or sheet 80 to establish the shape and position of a hide on the digitizing table and to produce an accurately corresponding shape and location of the same hide on the cutting table. It is to be understood, however, that many other different means may be used for such purposes without departing from the invention as broadly defined. For example, while a hide is spread on the digitizing table holes could be punched in it at appropriate points along its periphery and the location of such points digitized or otherwise captured and recorded with the digital representation of the hide provided to the computer 30 and/or with the physical label attached to the hide. Then when the hide is called up for cutting, in accordance with the recorded hole location information supplied by the computer or the label attached to the hide, pins could be placed on the cutting table at locations corresponding to the locations of the holes punched in the hide on the digitizing table, with the hide then being placed on the cutting table with its holes being placed over the prearranged pins.

I claim:

1. A method for cutting parts from a plurality of hides of different shapes and sizes, said method comprising:

providing a plurality of hides of different shape and size, converting said plurality of hides into a plurality of digitized hides by for each of said hides performing the steps of placing the hide in spread condition on a digitizing table, while said hide is on said digitizing table digitizing it to obtain a digital representation thereof, storing such digital representation in a computer memory, while said hide is on said digitizing table associating with it a means establishing its shape and its position relative to said digitizing table, and subsequently removing said hide from said digitizing table, providing part information defining a plurality of desired parts to be produced, using said stored representations of said digitized hides and said part information to derive from said plurality of digitized hides a set of hides from which said parts are to be produced and to provide for each hide of said set a set of instructions usable by an automated cutter to cut from said hide at least some of said desired parts; and then cutting each hide of said set of hides by placing it on the table of an automatic cutter using said shape and position establishing means associated with said hide to cause it to assume on said cutting table the same shape as it had when on said digitizing table and to have a position on said cutting table of known relation to its position on said digitizing table, and thereafter controlling said cutter using the set of instructions provided for that hide to cut from it parts corresponding to said set of instructions.

2. A method for cutting parts from a plurality of hides of different shapes and sizes as defined in claim 1 further characterized by:

providing said digitizing table with a plurality of pins extending upwardly therefrom and located on opposite sides of the space normally occupied by a hide while on said digitizing table, providing a plurality of pins on said cutting table which pins extend upwardly from said cutting table and have a placement on said cutting table corresponding to the placement of said first pins on said digitizing table, said step of associating with a hide while it is on said digitizing table of a means establishing its shape and position relative to said digitizing table comprising applying a flexible means to at least some of said digitizing table pins which flexible means has holes for receiving said pins and which when so received by said pins extends across said hide and is held in a relatively taut condition by said pins, and attaching said flexible means to said hide, and said step of removing a hide from said digitizing table including removal of said flexible means from said pins of said digitizing table with said flexible means remaining attached to said hide after the removal, and said step of using said shape and position establishing means associated with a hide to cause it to assume on said cutting table the same shape it had when on said digitizing table and to have a position on said cutting table of known relation to its position on said digitizing table including the step of bringing said hide to said cutting table with said flexible means still attached to it and moving the holes of said flexible means over said pins of said cutting table.

3. A method for cutting parts from a plurality of hides of different shapes and sizes as defined in claim 2 and further characterized by said step of attaching said flexible means to said hide being carried out by adhesively attaching said flexible means to said hide.

4. A method for cutting parts from a plurality of hides of different shapes and sizes as defined in claim 3 further characterized by said step of adhesively attaching said flexible means to said hide being carried out by having said flexible means carry a layer of pressure sensitive release adhesive, and using said layer of pressure sensitive release adhesive to adhere said flexible means to said hide.

5. A method for cutting parts from a plurality of hides of different shapes and sizes as defined in claim 2 further characterized by said flexible means being a plurality of flexible straps each having two openings located respectively at its two opposite ends for placement over two pins of said digitizer table or of said cutting table located on opposite sides of said hide.

6. A method for cutting parts from a plurality of hides of different shapes and sizes as defined in claim 2 further characterized by said flexible means being a sheet of flexible material having two side edges with each side edge including a plurality of openings for receiving a plurality of said pins of said digitizing table or a plurality of pins of said cutter table.

7. A method for cutting parts from a plurality of hides of different shapes and sizes as defined in claim 1 further characterized by applying a vacuum to the support surface of said digitizing table during the digitizing of each hide to aid in holding said hide flatly to said table while it is being digitized, and applying a vacuum to the support surface of said cutting table during said cutting of each hide to aid in holding said hide flatly to said cutting table during its cutting.

8. A method for cutting parts from a plurality of hides of different shapes and sizes as defined in claim 2 further characterized by said step of attaching a flexible means to a hide on said digitizing table being carried out after the step of digitizing said hide, and after a hide is placed on said cutting table removing said flexible means from said hide before performing said step of controlling said cutter to cut parts from the hide.

9. A method for cutting parts from a plurality of hides of different shapes and sizes as defined in claim 1 further characterized by said step of converting said plurality of hides into a plurality of digitized hides including, while each hide is spread on said digitizing table and before it is digitized, marking lines over the surface of said hide to designate faults and/or other areas of interest and including a digitizing of said lines in said digitizing step.

10. A method for cutting parts from a plurality of hides of different shapes and sizes as defined in claim 9 further characterized by said step of drawing lines over the surface of a hide spread on said digitizing table comprising the steps of first spreading an overlay sheet of transparent material over the hide spread on said digitizing table and then marking said lines indicating faults and/or other areas of interest onto said overlay sheet.

11. A method for cutting parts from a plurality of hides of different shapes and sizes as defined in claim 1 further characterized by said step of associating with a hide while on said digitizing table of a means establishing its shape and position relative to said digitizing table including punching a plurality of holes in said hide along its periphery, digitizing the locations of said holes while said hide is on said digitizing table, and making a record of said digitized hole locations, and said step of using said shape and position establishing means associated with a hide to cause it to assume on the cutting table the same shape as it had when on said digitizing table including the steps of prior to spreading a hide on said cutting table using said record of its digitized hole locations to arrange a set of pins on said cutting table having positions corresponding to said digitized hole locations, and then spreading said hide on said cutting table during which spreading said holes of said hide are placed over said prearranged pins on said cutting table.

12. A method for cutting parts from a plurality of hides of different shapes and sizes as defined in claim 1 further characterized by said step of converting said plurality of hides into a plurality of digitized hides including the step of attaching an identifying means to each hide of said plurality of digitized hides and including a related identification of each hide in the digital representation thereof supplied to said computer memory, whereby through said identifying means attached to each hide and said related representation thereof supplied to said computer memory said plurality of digitized hides can be related on a one-to-one reciprocal basis with their digital representations stored in computer memory.

13. A method for cutting parts from a plurality of hides of different shapes and sizes as defined in claim 12 further characterized by said identifying means applied to each of said digitized hides being a bar coded label readable by a compatible reader on the cutter to identify each hide as it is spread on the cutter table.

14. A method for cutting parts from a plurality of hides of different shapes and sizes, said method comprising:

providing a plurality of hides of different shape and size, providing a digitizing table having a surface for supporting a hide to be digitized and having a row of pins extending upwardly from said surface located on opposite sides of the space occupied by a hide when spread on said supporting surface, providing a cutting table having a surface for supporting a hide and having a plurality of pins located on opposite sides of the space occupied by a hide when spread on said cutting table with said pins of said cutting table having a placement corresponding to the placement of said pins of said digitizing table, spreading each hide on said digitizing table and digitizing it to provide a digital representation thereof, at some point before the removal of each hide from said digitizing table applying a flexible means, with holes for receiving said pins, to said pins of said digitizing table so that said flexible means extends across said hide, and attaching said hide to said flexible means, spreading each hide on said cutting table by placing the holes of the attached flexible means to said pins of said cutting table to cause said hide to assume on said cutting table a shape and position related to the shape and position of said hide on said digitizing table, using said digital representation of the hide spread on said cutting table to provide cutting instructions for cutting parts therefrom, and then cutting the hide spread on said cutting table using said cutting instructions.

15. An apparatus for cutting parts from a plurality of hides of different shapes and sizes, said apparatus comprising:

a digitizing table having a surface for supporting a hide to be cut and having a plurality of pins extending upwardly from said surface on opposite sides of the space occupied by a hide when spread on said supporting surface, a cutting table having a supporting surface for supporting a hide to be cut, said cutting table having a plurality of pins extending upwardly from said supporting surface thereof and located on opposite sides of the space occupied by a hide spread thereon for cutting with said pins of said cutting table having a placement related to that of said pins of said digitizing table, and a flexible means with holes for receiving said pins of said digitizing table and said pins of said cutting table which flexible means may be applied to said pins of said digitizing table and be attached to a hide so as to extend across and be attached to such hide as spread on said digitizing table, so that after removal of said hide and flexible means from said digitizing table said flexible means may be applied to said pins of said cutting table to cause said hide to assume on said cutting table the same shape as it had on said digitizing table.

16. An apparatus as defined in claim 15 further characterized by a means for applying a vacuum to said supporting surface of said digitizing table to aid in holding a hide spread on said digitizer table supporting surface in flat condition, and a means for applying a vacuum to said supporting surface of said cutting table to aid in holding a hide spread on said cutting table supporting surface in flat condition.

17. A digitizer for use in cutting hides, said digitizer comprising:

means providing a supporting surface for supporting a hide in spread condition, means for digitizing a hide spread on said supporting surface, a plurality of pins extending upwardly from said supporting surface on opposite sides of the space occupied by a hide spread thereon, and a flexible means with holes which may be placed over said pins so as to cause said flexible means to extend across a hide spread on said supporting surface and which flexible means may be attached to said hide to establish its shape and position relative to said supporting surface.

18. A digitizer as defined in claim 17 further characterized by means for applying a vacuum to said supporting surface to aid in holding a hide flatly to said supporting surface.

19. A cutter for cutting parts from a hide, said cutter comprising:

means providing a supporting surface for supporting a hide to be cut in spread condition, means for cutting parts from a hide spread on said supporting surface, a plurality of pins located on opposite sides of the space occupied by a hide spread on said supporting surface, and a flexible means with holes which may be moved over said pins so as to cause a hide attached to said flexible means to assume a shape and position relative to said supporting surface dictated by its attachment to said flexible means.

20. A cutter as defined in claim 19 further characterized by means for applying vacuum to said supporting surface to aid in holding a hide flatly to said supporting surface.

* * * * *